Nov. 16, 1948.   S. W. BRIGGS   2,454,033
FILTER
Filed Aug. 12, 1944
FIG. 1.
FIG. 2.
FIG. 3.
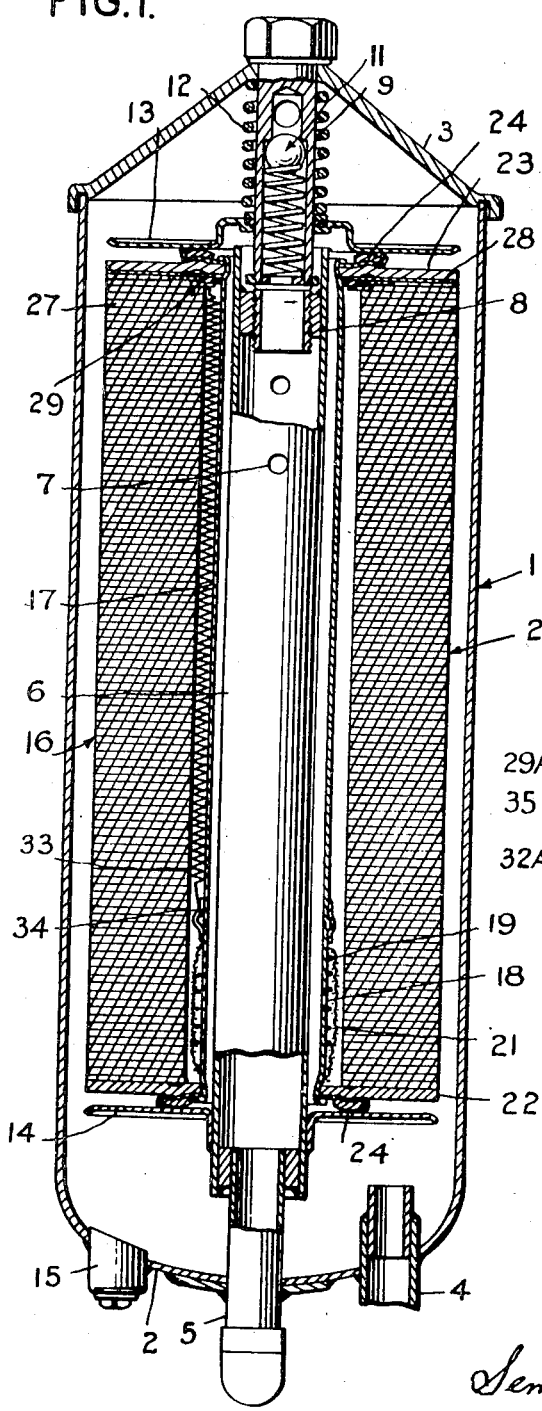
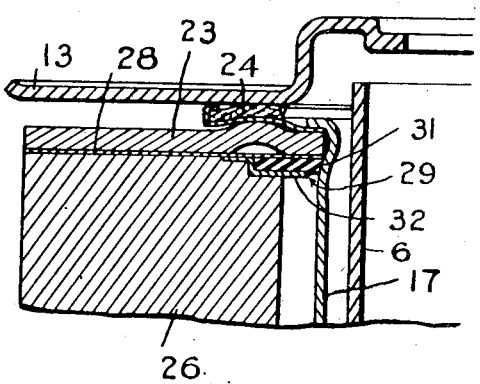
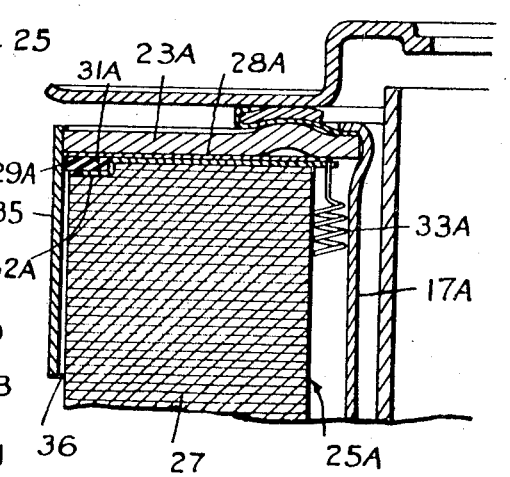
Inventor
SOUTHWICK W. BRIGGS.
Semmes Keegin Beale & Semmes
By
Attorneys Patented Nov. 16, 1948

2,454,033

UNITED STATES PATENT OFFICE 2,454,033

FILTER

Southwick W. Briggs, Washington, D. C.

Application August 12, 1944, Serial No. 549,242

6 Claims. (Cl. 210—187)

This invention relates to filtration, and more particularly has reference to a filtering device employing a filtering material that is adapted to contract and expand over a course of operation.

It is well known that certain materials used as filtration media, particularly cellulosic filtration materials, have a tendency to shrink after a period of use, especially if they are subjected to moisture. The material may be in various forms, such as loose particles, a plurality of elements, or a single unitary mass, and while the form may vary the degree of shrinkage, all forms are subject to some contraction, particularly under certain operating conditions.

The shrinkage does not appreciably vary the filtering efficiency of the material per se, but in certain filtering arrangements shrinkage may result in a by-pass of some of the fluid to be filtered around the filtering mass. In general this results where the filtering mass is a relatively unitary body and in normal operation is in close and fluid-tight engagement with a casing, plate, or other impervious holder for the filter mass. This can best be appreciated by the reference to the drawings which will be hereinafter made.

In general, the primary object of my invention is to provide means cooperating with a filter mass subject to shrinkage to prevent by-pass of the fluid around the filter mass when such shrinkage occurs.

Another object of this invention is to provide a container or holder for a shrinkable filter mass which is adapted to maintain a fluid-tight seal with the mass and the associated system as the mass may shrink or expand.

Yet another object of this invention is to provide means to prevent by-passing of a filter mass when the latter shrinks and which at the same time will not impair the filtering efficiency of the mass.

Still another object of this invention is to provide a plate engageable with one side of a filter mass and adapted to move with such side upon contraction and expansion of the mass, thereby providing a seal between the plate and the mass to prevent by-passing of fluid therebetween.

To accomplish the above and other important objects as will more fully appear hereinafter, the inventive concept broadly comprehends the use of a holder for a filter mass which is adapted to maintain tight engagement with the mass notwithstanding shrinkage and expansion of such mass. While not confined thereto, the concept finds particular application in connection with a filter mass held between two members which also serve to confine the flow so that the fluid is obliged to pass through the filter mass. In the specific embodiment illustrated herewith, the filter mass is of cylindrical shape and is so arranged with its associated structure that the fluid passes radially through the cylinder wall. This cylindrical body is held between end plates and structure is provided to prevent the flow of liquid other than through the cylinder wall. One of said end plates (herein called a "floating plate") is adapted to move axially with the cylinder upon expansion and contraction of the latter and is provided with a fluid seal to prevent by-passing of fluid around the cylinder.

In the accompanying drawings, there are disclosed two specific embodiments of my invention which adequately illustrate the basic concept, it being understood, however, that the invention finds application in other types of filters.

In these drawings:

Figure 1 is a vertical cross-sectional view of a filter which includes the present invention.

Figure 2 is a fragmentary detailed showing of the floating plate shown in Figure 1, provided with a fluid seal between the plate and the center tube of the refill.

Figure 3 is a detailed fragmentary view in modification of Figure 1 and showing the use of a floating plate with the fluid seal associated with an exterior casing about the refill.

The filter shown in Figure 1 is of generally conventional construction and is adapted for the filtration of oil in the lubricating system of an internal combustion engine. In the course of operation, such oil picks up in various ways appreciable traces of moisture and, as heretofore pointed out, the presence of moisture in the oil is apt to cause shrinkage of the filtering medium, particularly if the latter is of a cellulosic nature, such as a mass of loose fibers, paper, or a molded cellulosic block.

Referring particularly to Figure 1, the filter casing is designated generally by the numeral 1 and is of cylindrical construction with a base 2, forming a sump, and a removable cover 3. This filter is designed primarily for a so-called outside-inside filtration of the oil through the filter medium, and is provided with an inlet tube 4 and a discharge tube 5. Mounted upon and in communication with the discharge tube 5 is an assembly center tube 6 provided with apertures 7. The center tube 6 is provided with an interiorly threaded bushing 8 welded therein, into which is threaded a cover screw 9. A by-pass valve designated generally 11 is provided in the cover screw 9 so that in the event of plugging of the filter cartridge the lubricating system will not be robbed of its required oil. Surrounding the cover screw 9 is a spring 12 which bears against an assembly top plate 13 to urge the latter downwardly when the cover 3 is secured upon the casing. Mounted upon the center tube 6 is an assembly bottom plate 14. A clean-out plug 15 is provided in the base of the casing for the removal of sediment and sludge.

Intermediate the assembly top and bottom plates 13 and 14 is a cartridge designated generally 16. The cartridge becomes clogged with impurities after a period of operation and has to be replaced from time to time, hence it is generally called a "refill." This cartridge includes a refill center tube 17 which is provided with apertures 18. The apertures are surrounded by a coil spring 19 over which is positioned a wire netting or woven fabric 21 to prevent the entrance into holes 18 of any foreign material, and specifically any particles of the filtering material that may be dislodged from the filtering mass. In certain instances the tube 17 may take the form of a screen or perforated tube with holes throughout its entire length. Fixedly mounted at the base of the tube 17 is a refill base plate 22 and at its upper end a refill top plate 23. The base and top plates are provided with suitable gaskets 24 to maintain an oil-tight seal with the assembly top and base plates 13 and 14, and spring 12 possesses sufficient tension to insure such a tight fit.

Intermediate the refill base and top plates is a filtering mass designated generally 25, which is usually of cylindrical shape, and will be referred to herein as the cylinder. This filtering cylinder may be formed as a unitary block, such as indicated at 26 in Figure 2, or it may be composed of a plurality of superimposed discs 27, as shown in Figure 1. Particularly when a refill center tube is provided with merely holes at its base, as in the case of Figure 1, the inner periphery of the cylinder should be spaced from the refill center tube 17, and in this connection it will be noted that the refill center tube 17 is in turn spaced from the assembly center tube 6, thus providing for a free flow of oil from the filtering material into the discharge tube 5.

Upon shrinkage of filtering material in the cylinder 25, it is obvious that the cylinder would tend to retract from the refill base or upper plates 22 or 23, usually the latter. In such event there would be a space provided between the top of the cylinder 25 and the refill top plate 23 through which the dirty oil would be able to pass and then return to the lubricating system through holes 18 and 7 to the discharge tube 5 in an unfiltered condition.

It will be noted, however, that in the present invention there is provided the floating plate 28 which is interposed between the top of the cylinder 25 and the underside of the refill top plate 23. In the normal or expanded condition of cylinder 25 the floating plate 28 is securely clamped between the cylinder and top plate 23 so that no oil by-passes between the floating plate and the cylinder. It might be pointed out that in assembling the refill, the cylinder 25, whether composed of a block or a series of stacked discs, may be arranged around the refill center tube 17 to rest upon bottom plate 22, the floating plate 28 and refill top plate 23 applied to the top of the cylinder, and then pressure is exerted upon the assembly in order to compress the cylinder 25 to the desired extent, whereupon the center tube 17 is spun about the refill top plate 23 to secure the various elements in assembled relationship. The pressure exerted is sufficient to insure the proper compression of the cylinder 25 and to secure an oil-tight fit of the cylinder and plates, and also is ordinarily of such extent as to permit a certain amount of inherent shrinkage of the filtering material without any of the joints being opened. However, when the shrinkage is of an extent to vary the effective length of the cylinder, the floating plate 28 moves and maintains a fluid-tight fit with the end of the cylinder, preventing by-pass of the oil therebetween.

The floating plate 28 is provided with an oil seal designated generally 29, and, as best shown in Figure 2, the oil seal is composed of a neoprene ring 31 and a retaining plate 32. In this connection it will be noted that the inner periphery of the cylinder 25 may be shouldered in order to receive the retaining plate 32. While neoprene has been found to be a particularly efficacious material for the oil seal, it will be appreciated that any other suitable material that is oil and water resistant, and does not interfere with movement of the floating plate 28 upon the center tube 17, may be substituted.

In the device shown in Figure 1, a coil spring 33 is hooked to floating plate 28, or particularly the retaining plate 32, and is anchored at its opposite end to a spring retaining collar 34 located on the refill center tube adjacent the upper end of the screen or fabric 21. Three or more of such springs 33 are provided and thereby serve to center the cylinder 25 and to maintain it evenly spaced from the center tube 17. These springs also maintain a certain tension upon floating plate 28, and are sufficient to insure that the floating plate starts to slide upon the center tube 17 upon initial retraction of the end of the cylinder 25 away from the refill top plate 23. Likewise, in the event that the refill should be inserted in the filter upside down, the springs 33 have a sufficient tension to suspend the cylinder and to maintain the floating plate in contact with the adjacent cylinder end upon shrinkage.

While Figures 1 and 3 show springs 33 and 33A, and while some sort of spring tension is usually preferable for commercial installations, springs are not essential and forms of my invention have been made up which did not employ springs and were found to be entirely satisfactory. It will also be noted that Figure 2 of the drawings omits a spring arrangement. In this connection, it should be pointed out that, notwithstanding compression of the cylinder 25 and the tight fits of refill top plate 23 and floating plate 28, initial shrinkage of cylinder 25 permits at least a thin film of oil to enter between the refill top plate and the floating plate. As a matter of fact, in assembling the refill, the top of floating plate 29 and the underside of top plate 23, or both, are usually coated with oil to prevent rust and sticking of the two members, and in such event the film of oil above referred to is initially provided in the refill even before insertion in the filter casing. Any film is, of course, subject to the same pressure as the body of oil within the filter casing. This pressure serves to maintain the floating plate firmly seated upon the top of the cylinder 25 in an oil-tight fit, and as the cylinder retracts such pressure forces the top plate downwardly along with the retracting end.

It is to be noted that as the pressure of oil within the filter casing increases, the force exerted upon floating plate 28 will be correspondingly increased, and this in turn will tend to compress the cylinder 25 and thus reduce its porosity. To this extent the invention tends to compensate for variations in pressure of the oil within the casing, and to thus insure uniform filtration over periods of variable oil pressure. Inasmuch as shortening or contraction of the cylinder 25 is the result of increased oil pressure, as well as inherent shrinkage of the material per se, the cylinder 25 in actual operation will be shortened and extended with variations in the oil pressure. These variations may be of considerable magnitude, and are visually observable with fluctuations in the pressure of the oil charge.

As heretofore pointed out, the sealing ring 31 is of such construction as not to impede movement of the floating plate 28 upon the center tube 17, and likewise springs 33, if used, should not be of such tension as to interfere with such sliding movement. It will be noted however, that regardless of the position of floating plate 28, it is impossible for oil to by-pass between the floating plate and the refill top plate and thence down to discharge apertures 18 in the center tube 17. In other words, all of the flow of oil will be confined and directed through the cylinder 25, and consequently all of the oil will be effectively filtered.

As previously pointed out, the filter of Figure 1 is designed for flow of oil from the outside of cylinder 25 radially into the central bore of the cylinder, and in such case the floating plate is preferably slidably sealed to the refill center tube 17. However, the floating plate 28 may be sealed with respect to an enclosing casing or skirt, and this arrangement is preferable particularly in the case of an inside-outside flow.

In Figure 3 there is shown the invention as embodied in a structure in which the refill top plate 23A is provided with a depending skirt 35. This skirt should be of a length somewhat greater than the maximum amount of shrinkage of the cylinder 25, so that regardless of the extent of movement of the floating plate it will at all times be confined within the skirt. In Figure 3 the floating plate 28A is of generally similar construction to the floating plate of Figure 1, and is designed to normally rest between the refill top plate 23A and the cylinder 25A. It will be noted, however, that the oil seal 29A is located at the outer periphery of the floating plate and slidably engages the skirt 35. This oil seal, as in the case of Figure 1, comprises a neoprene ring 31A and a retaining plate 32A, the retaining plate extending the whole length of the floating plate 28A and to a point short of the refill center tube 17A.

The device shown in Figure 3 is adapted for inside-outside flow, and consequently the retaining plate 32A has a central opening sufficiently large to permit at all times a free passage of oil between the center tube 17A and its inner periphery. In this way the unfiltered oil is free to enter the space between the refill top plate 23A and the floating plate 28A when the cylinder contracts, and therefore the pressure of the oil charge is at all times exerted upon the top of floating plate 28A.

The floating plate 28A functions in the same manner as floating plate 28 of Figure 1. In other words, the spring 33A will cause the floating plate 28A to initially follow the shrinkage of the cylinder, and the pressure of the oil charge upon the top of floating plate 28A will force the floating plate into close and oil-tight engagement with the top of the cylinder, while oil seal 29A will prevent any by-pass of the unfiltered oil between the floating plate and the skirt 35.

While Figure 3 discloses merely a depending skirt 35 which is sufficient to cover the travel of floating plate 28A, and while this embodiment contemplates that the remaining length of the cylinder 25A will be unencased and open toward the casing 1, it may be advisable in certain instances to provide an open support of some sort extending from the base of skirt 35 to refill base plate 22. This open support may take the form of spaced rods, or a perforated sheet or screen-like element. In other words, any device that would permit the ready flow of oil to the exterior of the cylinder 25, and at the same time will afford some support or guide for the cylinder, may be used. As an illustration, a cylinder or tube may extend between the outer peripheries of the refill bottom and top plates 22 and 23, with the upper section of such plates imperforate as in the case of skirt 35, while the lower portion of such cylinder would be perforated.

It will be noted that a space 36 is provided between the outer periphery of the filter cylinder 25A and the inside of the skirt 35 or imperforate section of a casing or cylinder. By providing this space, the filtering capacity of that portion of the filter lying within the skirt is not lost, and would be used both in the case of inside-outside or outside-inside filtration.

While the use of a skirt or casing such as shown in Figure 3 is primarily designed and is preferable for an inside-outside flow, such a skirt or casing might also be used, if desired, with an outside-inside flow in the event that protection or a guide is desired for the exterior of the cylinder 25. In such event, however, it will be appreciated that the inner oil seal 29, such as shown in Figures 1 and 2, would be necessary, and the outer oil seal 29A might be omitted. If seal 29A were retained, it would be necessary to expose the upper side of the floating plate to the pressure of the oil charge by the use of holes or slots in the refill top plate 23A or in some other suitable manner.

Obviously many variations may be made in the specific details of construction, and in the manner of operation, but the foregoing is believed to illustrate the basic idea of this invention.

I claim:

1. In a fluid filter device, a filter cartridge comprising a tube, a disc-like plate secured to each end of the tube, a third disc-like plate intermediate the end plates slidable upon the tube in a fluid tight fit, a cylindrical mass of filtering material intermediate one of the end plates and the slidable plate, tension means tending to urge the floating plate against the cylinder, the inner periphery of said filter mass being spaced from the tube, and a hole in the tube located adjacent the end plate engaged by the filter mass.

2. In a fluid filter device, a mass of filtering material, a channel extending through the mass, a plate substantially co-extensive with one end of the mass perpendicular to the channel, a skirt extending from the plate encasing at least a part of the mass but spaced therefrom, a plate in a fluid tight fit with the opposite end of the mass and substantially co-extensive therewith, said two plates being fixedly spaced with respect to each other, and a plate within the skirt in fluid tight engagement with the end of the mass adjacent the first mentioned plate, an aperture in said plate registering with the channel of the mass, said last mentioned plate being slidable within the skirt in a fluid tight fit therewith and bearing against the adjacent end of the mass during expansion and contraction of the mass.

3. In a fluid filter device, an apertured tube, a plate fixedly mounted at one end of the tube, a second plate fixedly mounted at the other end of the tube, a skirt extending from the first plate toward the second plate, a plate slidable in a fluid tight fit within the skirt, an aperture in the slidable plate larger than the exterior of the tube, and a mass of filter material surrounding but spaced from the tube, said mass being engaged in a fluid tight fit by the slidable plate and the second mentioned plate.

4. In a fluid filter device, a casing, an inlet port and an outlet port, a tube mounted in the casing in communication with one port, a plate mounted upon the tube, a filter cartridge supported by said plate and spaced from the tube, gasket means at each end of the filter cartridge, a second plate engaging the gasket means at the opposite end of the cartridge to maintain the cartridge fixed with respect to the tube, an aperture in the tube intermediate the plates, said cartridge comprising a center tube, end plates fixedly mounted upon each end of the center tube in fluid tight fit therewith, a third plate intermediate the two fixed end plates slidable upon the center tube in a fluid tight fit and normally resting against one of the fixed end plates, a mass of filtering media surrounding but spaced from the center tube, one end of said mass resting upon one of said end plates, the opposite end of said mass bearing against the slidable plate, said slidable plate movable away from its adjacent end plate upon contraction of the filtering mass to constantly maintain fluid tight engagement with the proximate end of the mass of filter medium.

5. In a filter device, a center tube, a plate secured in a fluid tight connection to each end of the tube, a filter mass surrounding the tube having one end adjoining one of the fixed plates, a plate slidable on the center tube and in fluid tight engagement with the center tube adjacent the other end of the filter mass, and resilient means under tension attached to the center tube and slidable plate urging said slidable plate against the filter mass.

6. A filter comprising a casing having an inlet port and an outlet port, a conduit communicating with one of said ports extending through the casing, closing means at the end of the conduit remote from the port communicating therewith preventing flow of the fluid to be filtered through the remote end, a flange rigidly attached to the conduit with a fluid tight fit, a filter cartridge supported on said flange, said cartridge comprising a tube, a plate rigidly attached to the tube at each of its ends, a filter mass resting on one of said plates, a third plate normally adjacent the other of said fixed plates slidable upon said tube in a fluid tight fit and intermediate the fixed plates, said slidable plate bearing against the filter mass at all times in a fluid tight seal, a plate slidable upon the closing means preventing flow through the end of the conduit remote from the port communicating therewith, in a fluid tight fit, resilient means urging the plate slidable upon the closing means against the fixed plate remote from said flange to hold the filter cartridge firmly in place, and apertures in said conduit and center tube intermediate the ends of the filter mass to allow passage of the fluid being filtered.

SOUTHWICK W. BRIGGS.

REFERENCES CITED

The following references are of record in the file of this patent:

UNITED STATES PATENTS

| Number | Name | Date |
|---|---|---|
| 730,485 | Simoneton | June 9, 1903 |
| 1,453,310 | Engel, Sr. | May 1, 1923 |
| 1,800,625 | Hall et al. | Apr. 14, 1931 |
| 2,110,009 | Weidenbacker | Mar. 1, 1938 |
| 2,133,004 | Williams et al. | Oct. 11, 1938 |
| 2,190,305 | Auberschek | Feb. 13, 1940 |
| 2,325,399 | Houston | July 27, 1943 |
| 2,339,703 | Kamrath | Jan. 18, 1944 |
| 2,345,848 | Winslow et al. | Apr. 4, 1944 |

FOREIGN PATENTS

| Number | Country | Date |
|---|---|---|
| 597,003 | France | Aug. 21, 1925 |
| 608,587 | France | Apr. 24, 1926 |
| 730,485 | France | June 9, 1903 |